(12) United States Patent
Sprowls

(10) Patent No.: US 8,387,147 B2
(45) Date of Patent: *Feb. 26, 2013

(54) METHOD AND SYSTEM FOR DETECTING AND REMOVING HIDDEN PESTWARE FILES

(75) Inventor: Patrick Sprowls, Boulder, CO (US)

(73) Assignee: Webroot Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/184,925

(22) Filed: Jul. 18, 2011

(65) Prior Publication Data

US 2011/0289587 A1    Nov. 24, 2011

Related U.S. Application Data

(62) Division of application No. 11/482,903, filed on Jul. 7, 2006, now Pat. No. 7,996,903.

(51) Int. Cl.
    *G06F 12/14* (2006.01)
(52) U.S. Cl. .............. 726/24; 726/22; 726/23; 726/25; 726/26; 726/27; 713/194; 707/952; 711/131; 711/162
(58) Field of Classification Search ............ 726/22–27; 713/194; 707/952; 711/131, 162
    See application file for complete search history.

(56) References Cited

U.S. PATENT DOCUMENTS

| | | | |
|---|---|---|---|
| 5,623,600 A | 4/1997 | Ji et al. |
| 5,809,138 A | 9/1998 | Netiv |
| 5,920,696 A | 7/1999 | Brandt et al. |
| 5,951,698 A | 9/1999 | Chen et al. |
| 6,069,628 A | 5/2000 | Farry et al. |
| 6,073,241 A | 6/2000 | Rosenberg et al. |
| 6,092,194 A | 7/2000 | Touboul |
| 6,154,844 A | 11/2000 | Touboul |
| 6,167,520 A | 12/2000 | Touboul |
| 6,173,291 B1 | 1/2001 | Jenevein |
| 6,310,630 B1 | 10/2001 | Kulkarni et al. |
| 6,374,363 B1 | 4/2002 | Wu et al. |
| 6,397,264 B1 | 5/2002 | Stasnick et al. |
| 6,405,316 B1 | 6/2002 | Krishnan et al. |
| 6,460,060 B1 | 10/2002 | Maddalozzo, Jr. et al. |
| 6,480,962 B1 | 11/2002 | Touboul |
| 6,535,931 B1 | 3/2003 | Celi, Jr. |
| 6,611,878 B2 | 8/2003 | De Armas et al. |
| 6,633,835 B1 | 10/2003 | Moran et al. |
| 6,667,751 B1 | 12/2003 | Wynn et al. |
| 6,701,441 B1 | 3/2004 | Balasubramaniam et al. |
| 6,721,721 B1 | 4/2004 | Bates et al. |
| 6,772,345 B1 | 8/2004 | Shetty |
| 6,785,732 B1 | 8/2004 | Bates et al. |
| 6,804,780 B1 | 10/2004 | Touboul |
| 6,813,711 B1 | 11/2004 | Dimenstein |

(Continued)

OTHER PUBLICATIONS

"NTFSPROG—TODO" [Online]; Aug. 2004; pp. 1-15; XP002448002; linus.file-systems.ntfs.devel; retrieved from the Internet: URL:http//ml.osdir.com/linus.file-systems.ntfs.deve1/2004-08/msg00023.html: retrieved on Aug. 23, 2007.

(Continued)

*Primary Examiner* — Thanhnga B Truong
(74) *Attorney, Agent, or Firm* — Sheridan Ross P.C.

(57) ABSTRACT

A method and system for detecting and removing a hidden pestware file is described. One illustrative embodiment detects, using direct drive access, a file on a computer storage device; determines whether the file is also detectable by the operating system by attempting to access the file using a standard file Application-Program-Interface (API) function call of the operating system; identifies the file as a potential hidden pestware file, when the file is undetectable by the operating system; confirms through an automated pestware-signature scan of the potential hidden pestware file that the potential hidden pestware file is a hidden pestware file; and removes automatically, using direct drive access, the hidden pestware file from the storage device.

5 Claims, 5 Drawing Sheets

U.S. PATENT DOCUMENTS

| | | |
|---|---|---|
| 6,829,654 B1 | 12/2004 | Jungek |
| 6,910,134 B1 | 6/2005 | Maher et al. |
| 6,965,968 B1 | 11/2005 | Touboul |
| 7,055,008 B2 | 5/2006 | Niles et al. |
| 7,058,822 B2 | 6/2006 | Edery et al. |
| 7,107,617 B2 | 9/2006 | Hursey et al. |
| 7,246,209 B2 | 7/2007 | Tran |
| 7,266,843 B2 | 9/2007 | Tarbotton et al. |
| 7,275,215 B2 | 9/2007 | Werndorfer et al. |
| 7,284,273 B1 | 10/2007 | Szor |
| 7,480,683 B2 | 1/2009 | Thomas |
| 7,533,131 B2 | 5/2009 | Thomas |
| 7,565,695 B2 | 7/2009 | Burtscher |
| 7,617,534 B1 | 11/2009 | Szor |
| 7,996,903 B2 | 8/2011 | Sprowls |
| 8,079,032 B2 | 12/2011 | Nichols |
| 2002/0162015 A1 | 10/2002 | Tang |
| 2002/0166063 A1 | 11/2002 | Lachman et al. |
| 2003/0065943 A1 | 4/2003 | Geis et al. |
| 2003/0074581 A1 | 4/2003 | Hursey et al. |
| 2003/0079145 A1 | 4/2003 | Kouznetsov et al. |
| 2003/0101381 A1 | 5/2003 | Mateev et al. |
| 2003/0159070 A1 | 8/2003 | Mayer et al. |
| 2003/0217287 A1 | 11/2003 | Kruglenko |
| 2003/0229801 A1 | 12/2003 | Kouznetsov et al. |
| 2003/0233566 A1 | 12/2003 | Kouznetsov et al. |
| 2003/0233574 A1 | 12/2003 | Kouznetsov et al. |
| 2004/0003276 A1 | 1/2004 | Kouznetsov et al. |
| 2004/0010703 A1 | 1/2004 | Kouznetsov et al. |
| 2004/0025042 A1 | 2/2004 | Kouznetsov et al. |
| 2004/0030914 A1 | 2/2004 | Kelley et al. |
| 2004/0034794 A1 | 2/2004 | Mayer et al. |
| 2004/0064736 A1 | 4/2004 | Obrecht et al. |
| 2004/0080529 A1 | 4/2004 | Wojcik |
| 2004/0088570 A1 | 5/2004 | Roberts et al. |
| 2004/0143763 A1 | 7/2004 | Radatti |
| 2004/0148281 A1 | 7/2004 | Bates |
| 2004/0187023 A1 | 9/2004 | Alagna et al. |
| 2004/0225877 A1 | 11/2004 | Huang |
| 2005/0033975 A1 | 2/2005 | Lahti et al. |
| 2005/0038697 A1 | 2/2005 | Aaron |
| 2005/0138433 A1 | 6/2005 | Linetsky |
| 2005/0149726 A1 | 7/2005 | Joshi |
| 2005/0154885 A1 | 7/2005 | Viscomi et al. |
| 2005/0257266 A1 | 11/2005 | Cook |
| 2006/0031940 A1 | 2/2006 | Rozman |
| 2006/0085528 A1 | 4/2006 | Thomas |
| 2006/0101264 A1 | 5/2006 | Costea et al. |
| 2006/0236396 A1 | 10/2006 | Horne |
| 2006/0265761 A1 | 11/2006 | Rochette |
| 2006/0272021 A1 | 11/2006 | Marinescu |
| 2006/0277182 A1 | 12/2006 | Nichols et al. |
| 2006/0277183 A1 | 12/2006 | Nichols et al. |
| 2007/0006311 A1 | 1/2007 | Barton |
| 2007/0094496 A1 | 4/2007 | Burtscher |
| 2007/0094726 A1 | 4/2007 | Wilson et al. |
| 2007/0168285 A1 | 7/2007 | Girtakovskis et al. |
| 2007/0168694 A1 | 7/2007 | Maddaloni et al. |
| 2007/0168982 A1 | 7/2007 | Horne |
| 2007/0169191 A1 | 7/2007 | Greene et al. |
| 2007/0169197 A1 | 7/2007 | Horne |
| 2007/0226800 A1 | 9/2007 | Nichols |
| 2007/0261117 A1 | 11/2007 | Boney |

OTHER PUBLICATIONS

Yi-Min Wang et al.; "Detecting Stealth Software with Strider Ghostbuster" Dependable Systems and Networks, 2005, DSN 2005, Proceedings, International Conference on Yokohama, Japan 28-0 Jun. 2005, Piscatay, NJ, USA, IEE, Jun. 28, 2005; pp. 368-377; XP010817813; ISBN; 0-7695-2282-3.

Codeguru, Three Ways to Inject Your Code Into Another Process, by Robert Kuster, Aug. 4, 2003, 22 pgs.

Codeguru, Managing Low-Level Keyboard Hooks With the Windows API for VB .Net, by Paul Kimmel, Apr. 18, 2004, 10 pgs.

Codeguru, Hooking the Keyboard, by Anoop Thomas, Dec. 13, 2001, 6 pgs.

Illusive Security, Wolves in Sheep's Clothing: malicious DLLs Injected Into trusted Host Applications, Author Unknown, http://home.arcor.de/scheinsicherheit/dll.htm 13 pgs.

DevX.com, Intercepting Systems API Calls, by Seung-Woo Kim, May 13, 2004, 6 pgs.

Microsoft.com, How to Sublass a Window in Windows 95, Article ID 125680, Jul. 11, 2005, 2 pgs.

MSDN, Win32 Hooks by Kyle Marsh, Jul. 29, 1993, 15 pgs.

PCT Search Report, PCT/US05/34874, Jul. 5, 2006, 7 Pages.

Yurcik, William et al., A Planning Framework for Implementing Virtual Private Networks, Jun. 2001, IT Pro, IEEE, pp. 41-44.

Official Action for U.S. Appl. No. 11/482,903, mailed Oct. 16, 2009, 5 pages Restriction Requirement.

Official Action for U.S. Appl. No. 11/482,903, mailed Apr. 26, 2009, 9 pages.

Official Action for U.S. Appl. No. 11/482,903, mailed Dec. 6, 2010, 5 pages.

Notice of Allowance for U.S. Appl. No. 11/482,903, mailed Mar. 31, 2011, 10 pages.

Official Action for U.S. Appl. No. 13/184,931, mailed May 17, 2012, 4 pages.

METHOD AND SYSTEM FOR DETECTING AND REMOVING HIDDEN PESTWARE FILES

RELATED APPLICATIONS

The present application claims priority to U.S. patent application Ser. No. 11/482,903, entitled "Method and System for Detecting and Removing Hidden Pestware Files" and filed Jul. 7, 2006. Additionally, this application is related to the following commonly owned and assigned applications: U.S. patent application Ser. No. 11/145,593, entitled "System and Method for Neutralizing Locked Pestware files"; U.S. patent application Ser. No. 11/104,202, entitled "System and Method for Directly Accessing Data from a Data Storage Medium"; U.S. patent application Ser. No. 11/145,592, entitled "System and Method for Analyzing Locked Files"; U.S. patent application Ser. No. 11/386,590, entitled "Method and System for Rendering Harmless a Locked Pestware Executable Object"; and Ser. No. 13/184,931, entitled "Method and System for Detecting and Removing Hidden Pestware Files", filed concurrently herewith, each of which is incorporated herein by reference.

FIELD OF THE INVENTION

The present invention relates generally to protecting computers from pestware or malware. In particular, but not by way of limitation, the present invention relates to techniques for detecting and removing hidden pestware or malware files on a storage device of a computer.

BACKGROUND OF THE INVENTION

Protecting personal computers against a never-ending onslaught of "pestware" such as viruses, Trojan horses, spyware, adware, and downloaders on personal computers has become vitally important to computer users. Some pestware is merely annoying to the user or degrades system performance. Other pestware is highly malicious.

Many computer users depend on anti-pestware software that attempts to detect and remove pestware automatically. Anti-pestware software typically scans running processes in memory and files contained on storage devices such as disk drives, comparing them, at expected locations, against a set of "signatures" that identify specific, known types of pestware. Difficulties arise, however, when pestware hides itself from the operating system of the computer. One way in which pestware hides itself is by hooking one or more Application-Program-Interface (API) functions of the operating system, changing the way they operate in a manner that renders the pestware undetectable by the operating system. The resulting hidden pestware file is sometimes referred to as a "rootkit-masked file." Conventional anti-pestware software does not always detect such hidden pestware files.

It is thus apparent that there is a need in the art for an improved method and system for detecting and removing hidden pestware files.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a method and system for detecting a potential hidden pestware file on a storage device of a computer. One illustrative embodiment is a method, comprising detecting, using direct drive access, a file on the storage device; determining whether the file is detectable by the operating system by attempting to access the file using a standard file API function call of the operating system; identifying the file as a potential hidden pestware file, when the file is undetectable by the operating system; confirming through an automated pestware-signature scan of the potential hidden pestware file that the potential hidden pestware file is a hidden pestware file; and removing automatically, using direct drive access, the hidden pestware file from the storage device.

Another illustrative embodiment is a system for detecting a potential hidden pestware file on a storage device of a computer, comprising a file-detection module configured to detect, using direct drive access, a file on the storage device; a file-analysis module configured to determine whether the file is detectable by the operating system by attempting to access the file using a standard file API function call of the operating system; a file-classification module configured to flag the file as a potential hidden pestware file, when the file is undetectable by the operating system; a pestware-scanning module configured to confirm, through an automated pestware-signature scan of the potential hidden pestware file, that the potential hidden pestware file is a hidden pestware file; and a pestware-removal module configured to remove automatically, using direct drive access, the hidden pestware file from the storage device These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1A:
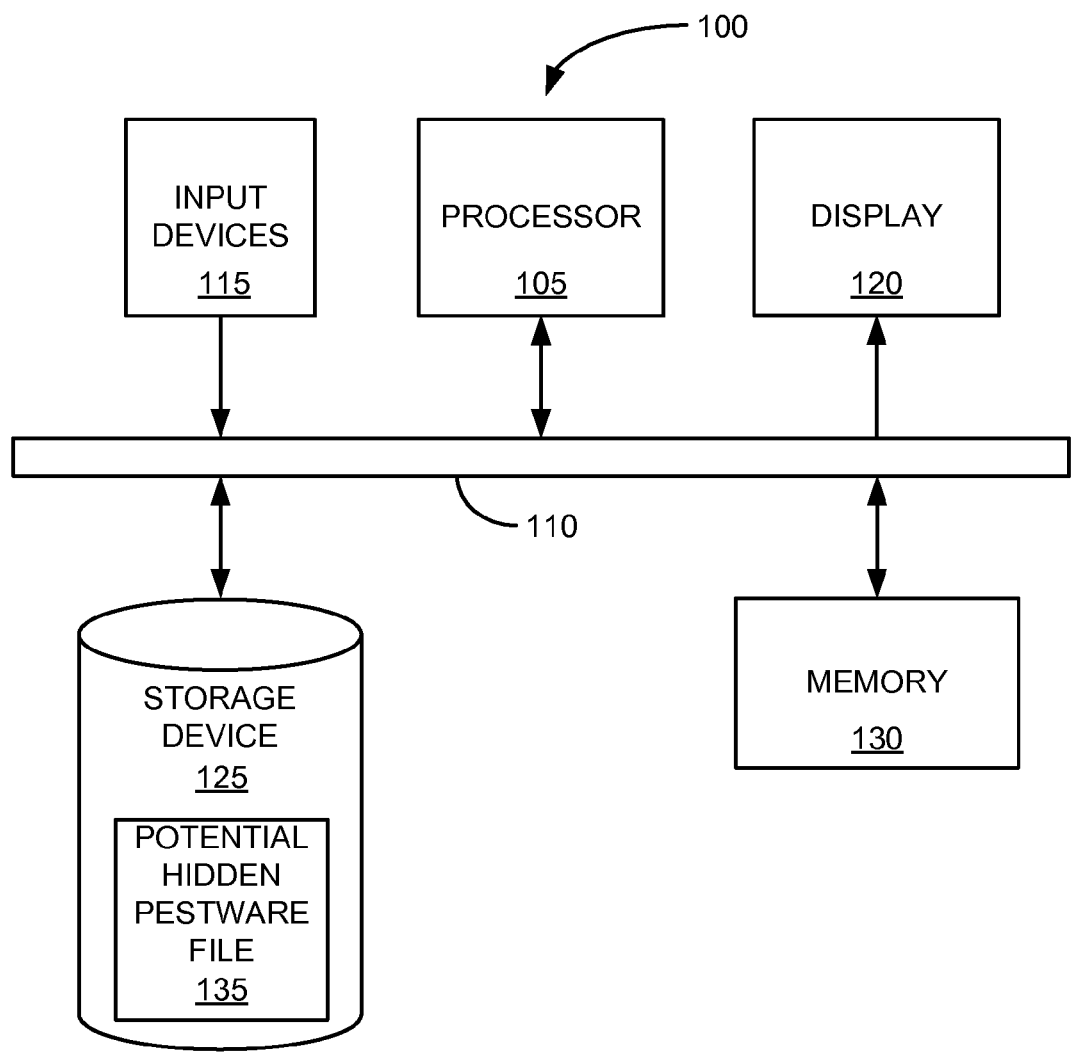
FIG. 1A is a functional block diagram of a computer equipped with an anti-pestware system in accordance with an illustrative embodiment of the invention.

"Pestware," as used herein, refers to any program that damages or disrupts a computer system or that collects or reports information about a person or an organization. Examples include, without limitation, viruses, worms, Trojan horses, spyware, adware, and downloaders.

In an illustrative embodiment, a reliable and thorough method of detecting files on a storage device of a computer is employed. One such reliable and thorough method is direct drive access. "Direct drive access," a term well known to those skilled in the computer programming art, is a method for accessing a computer storage device (a "drive") that bypasses the standard file- and directory-level Application-Program-Interface (API) function calls of the operating system. In direct drive access, the storage device is accessed at the sector (physical) level instead of at the file (logical) level. Direct drive access is also sometimes called "raw I/O." For example, operating systems sold by Microsoft Corporation under the trade name WINDOWS (e.g., WINDOWS XP) include a "CreateFile( )" direct-drive-access API.

Once a file has been detected using a reliable, thorough method such as direct drive access, an attempt is made to access the same file using a standard file API of the operating system. One such API in WINDOWS operating systems is "GetFileAttributes( )." If the attempt succeeds, the file is detectable by the operating system. If the attempt fails, the file is undetectable by the operating system, and the file is flagged as a potential hidden pestware file. In some cases, the inability of the operating system to "see" the file is caused by pestware having "hooked" one or more APIs of the operating system, altering their normal behavior. Direct drive access allows files to be detected despite such obfuscation techniques.

Once a file has been flagged as a potential hidden pestware file, it may subsequently be scanned automatically for pestware signatures to confirm that it is indeed a hidden pestware file that poses a threat to the computer. Once confirmed as a hidden pestware file, the file is automatically removed from the storage device using direct drive access. Optionally, the file may be backed up (quarantined) before it is removed in case it becomes necessary to restore it later (e.g., if it turns out that the file is not really pestware after all).

The detection of potential hidden pestware files just described may, in some embodiments, be part of a systematic scan of some or all of the data-bearing portion of a computer storage device. It is advantageous to perform such a scan by reading the storage device sequentially in physical sector order. This eliminates the need to lift the head from the disk, in the case of magnetic storage devices, speeding up the scan and making it more efficient. For example, on computers equipped with New-Technology-File-System (NTFS) volumes, the Master File Table (MFT) can be read sequentially using direct drive access. As the storage device is read, the techniques explained above may be used to detect potential hidden pestware files. Potential hidden pestware files can be confirmed as pestware through a subsequent automated pestware-signature scan and automatically removed from the computer entirely.

Referring now to the drawings, where like or similar elements are designated with identical reference numerals throughout the several views, and referring in particular to FIG. 1A, it is a functional block diagram of a computer 100 equipped with an anti-pestware system for detecting and removing pestware from computer 100, in accordance with an illustrative embodiment of the invention. Computer 100 can be a desktop computer, workstation, laptop computer, notebook computer, handheld computer, or any other device that includes computing functionality. In FIG. 1A, processor 105 communicates over data bus 110 with input devices 115, display 120, storage device 125, and memory 130.

Input devices 115 may be, for example, a keyboard and a mouse or other pointing device. In an illustrative embodiment, storage device 125 is a magnetic-disk device such as a hard disk drive (HDD) that stores directories (or folders) and files. In other embodiments, however, storage device 125 can be any type of computer storage device ("drive"), including, without limitation, a magnetic-disk drive, an optical-disc drive, and a storage device employing flash-memory-based media such as a secure digital (SD) card or multi-media card (MMC). Memory 130 may include random-access memory (RAM), read-only memory (ROM), or a combination thereof. Storage device 125 may contain one or more potential hidden pestware files 135 that can be detected and removed by the anti-pestware system once they have been confirmed to be pestware.

Figure 1B:
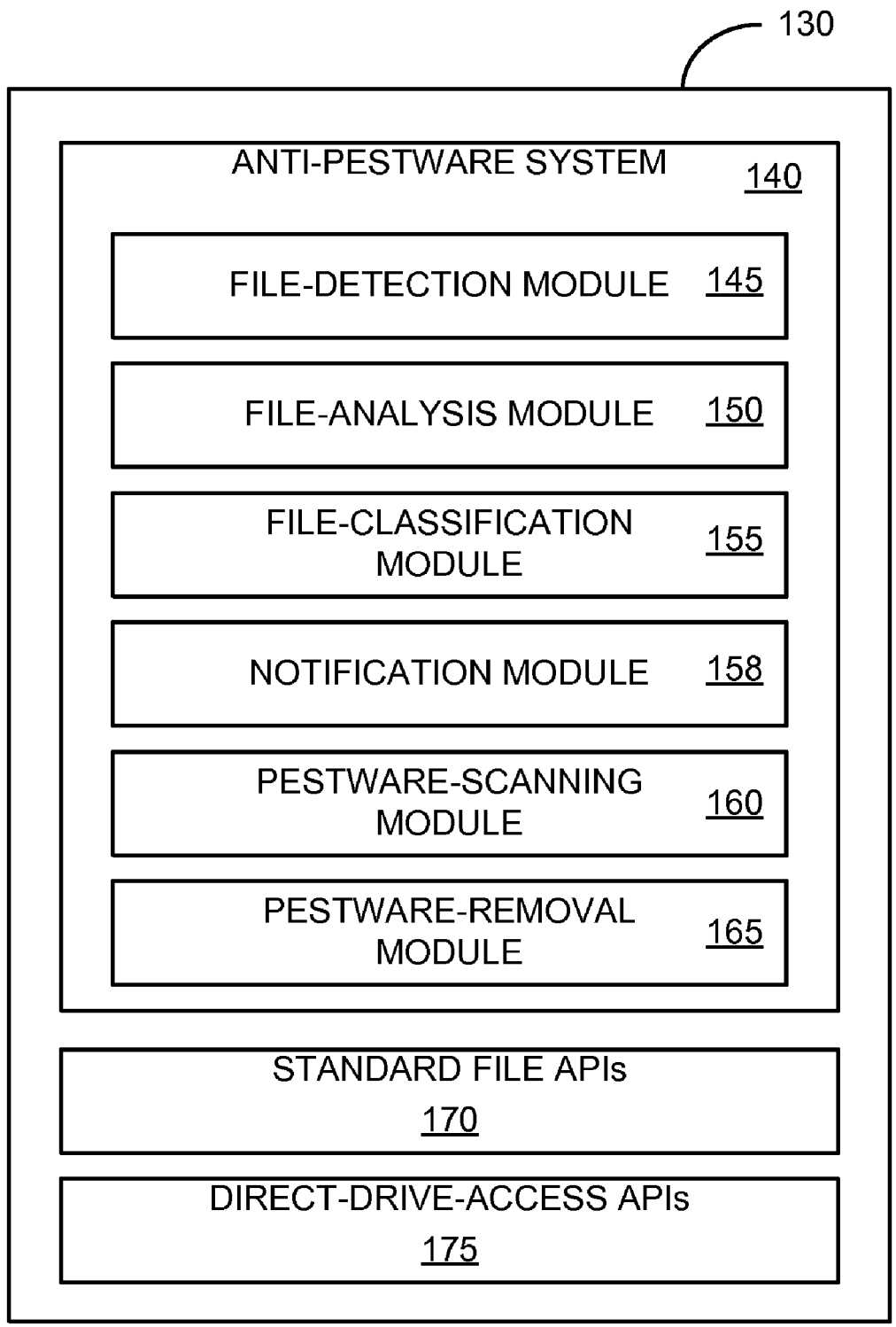
FIG. 1B is a diagram of a memory of the computer shown in FIG. 1A, in accordance with an illustrative embodiment of the invention.

FIG. 1B is a diagram of memory 130 of computer 100 shown in FIG. 1A, in accordance with an illustrative embodiment of the invention. Memory 130 includes anti-pestware system 140. For convenience in this Detailed Description, the functionality of anti-pestware system 140 has been divided into several components, including, in this illustrative embodiment, file-detection module 145, file-analysis module 150, file-classification module 155, pestware-scanning module 160, and pestware-removal module 165. In various embodiments of the invention, the functionality of these components can be combined or subdivided in ways other than that indicated in FIG. 1B. Also, not all of these components are necessarily included in every embodiment of the invention.

Memory 130 also includes a set of standard file APIs 170 and at least one direct-drive-access API 175. In WINDOWS operating systems, one such direct-drive-access API 175 is "CreateFile( )."

In the illustrative embodiment of FIG. 1B, anti-pestware system 140 is an application program stored on a computer-readable storage medium (e.g., storage device 125) of computer 100 that can be loaded into memory 130 and executed by processor 105. In other embodiments, the functionality of file deletion engine 135 can be implemented in software, firmware, hardware, or any combination thereof.

File-detection module 145 is configured to detect files on storage device 125 using a reliable, thorough method such as direct drive access, as explained above. File-analysis module 150 is configured to determine whether a file detected by file-detection module 145 is also detectable by the operating system of computer 100. To do so, file-analysis module 150 attempts to access the file using a standard file API function call 170 of the operating system. Those skilled in the art of programming in a WINDOWS environment will recognize that one example of such a standard file API 170 is "GetFileAttributes( )." If the attempt succeeds, the file is, by definition, detectable by the operating system. If the attempt fails, the file is regarded as a potential hidden pestware file 135 requiring further analysis. File-classification module 155 is configured to keep track of which files detected by file-detection module 145, based on the test performed by file-analysis module 150, are potential hidden pestware files 135.

Once a potential hidden pestware file 135 has been identified, notification module 158, in an illustrative embodiment, is configured to inform a user of computer 100 that a potential hidden pestware file 135 has been found on storage device 125. For example, notification module 158 may output such a message to display 120. Notification module 158, in this embodiment, is further configured to present the user with the option of removing the potential hidden pestware file 135 regardless of whether the potential hidden pestware file 135 has been confirmed to be a hidden pestware file.

In a different illustrative embodiment, once a potential hidden pestware file 135 has been identified, pestware-scanning module automatically performs a pestware-signature scan of the potential hidden pestware file 135 to determine whether it really is a hidden pestware file. If so, the hidden pestware file can be removed from storage device 125 automatically.

If, in the illustrative embodiment described above, the user responds with a request to delete a potential hidden pestware file 135 when given the option by notification module 158, pestware-removal module 165 removes the potential hidden pestware file 135 from storage device 125 using direct drive access. If, in the other illustrative embodiment described above, pestware-scanning module 160 confirms that a potential hidden pestware file 135 is indeed a hidden pestware file, pestware-removal module 165 automatically removes the hidden pestware file from storage device 125 using direct drive access.

In some embodiments, removal module 165 is configured to quarantine the hidden pestware file before removing the hidden pestware file from its original location on storage device 125. This provides for later recovery of the file if the removal was in error.

Figure 2:
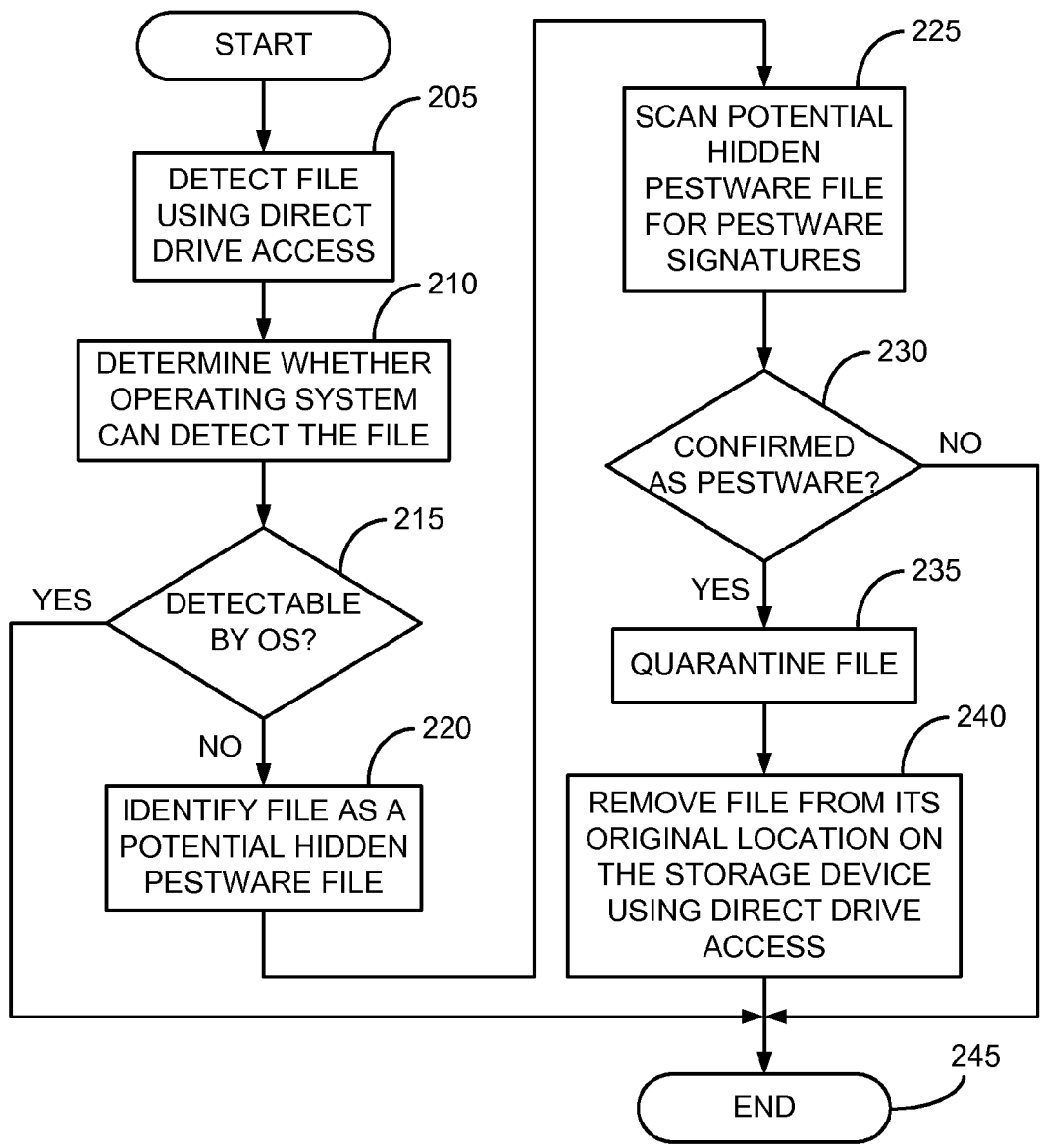
FIG. 2 is a flowchart of a method for detecting and removing a hidden pestware file on a storage device of a computer in accordance with an illustrative embodiment of the invention.

FIG. 2 is a flowchart of a method for detecting and removing a hidden pestware file 135 on a storage device 125 of a computer 100 in accordance with an illustrative embodiment of the invention. At 205, file-detection module 145 detects, using direct drive access, a file on storage device 125. At 210, file-analysis module 150 determines whether the operating system of computer 100 can detect the file by attempting to access the file using a standard file API function call 170 of the operating system. If the file is undetectable by the operating system (OS) at 215, file-classification module 155 flags the files as a potential hidden pestware file 135 at 220. At 225, pestware-scanning module 160 automatically performs a signature scan of the potential hidden pestware file 135 to determine whether or not it is actually a hidden pestware file. If the potential hidden pestware file 135 is confirmed to be a hidden pestware file at 230, pestware-removal module 165 optionally quarantines the file at 235. At 240, pestware-removal module 165 automatically removes the hidden pestware file from its original location on storage device 125. In doing so, pestware-removal module 165 may employ direct drive access. At 245, the process terminates.

Figure 3:
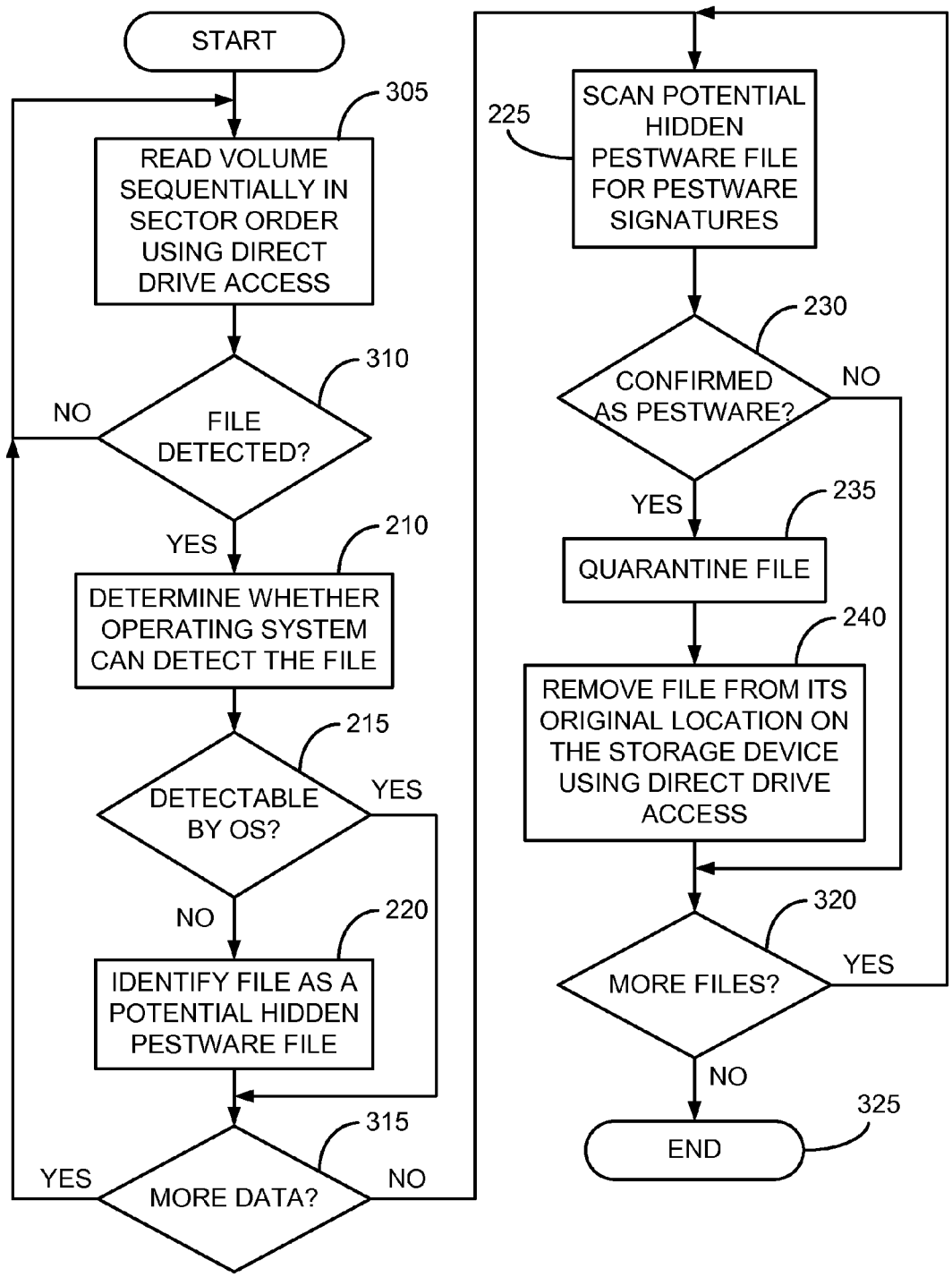
FIG. 3 is a flowchart of a method for scanning a storage device of a computer for hidden pestware files in accordance with an illustrative embodiment of the invention.

FIG. 3 is a flowchart of a method for scanning a storage device 125 of a computer 100 for hidden pestware files in accordance with an illustrative embodiment of the invention. At 305, file-detection module 145 reads storage device 125 sequentially in sector order using direct drive access. In some embodiments, file-detection module 145 reads the entire data-bearing portion of storage device 125 in this fashion. In other embodiments, a limited part of the data-bearing portion of storage device 125 is read. If file-detection module 145 detects a file on storage device 125 at 310, Blocks 210, 215, and 220 are performed for that file as explained in connection with FIG. 2. If the task of reading storage device 125 is complete at 315, Blocks 225, 230, 235, and 240 are performed as explained in connection with FIG. 2 for each potential hidden pestware file 135 that has been identified. Once all identified potential hidden pestware files 135 have been processed at 320, the process terminates at 325.

Figure 4:
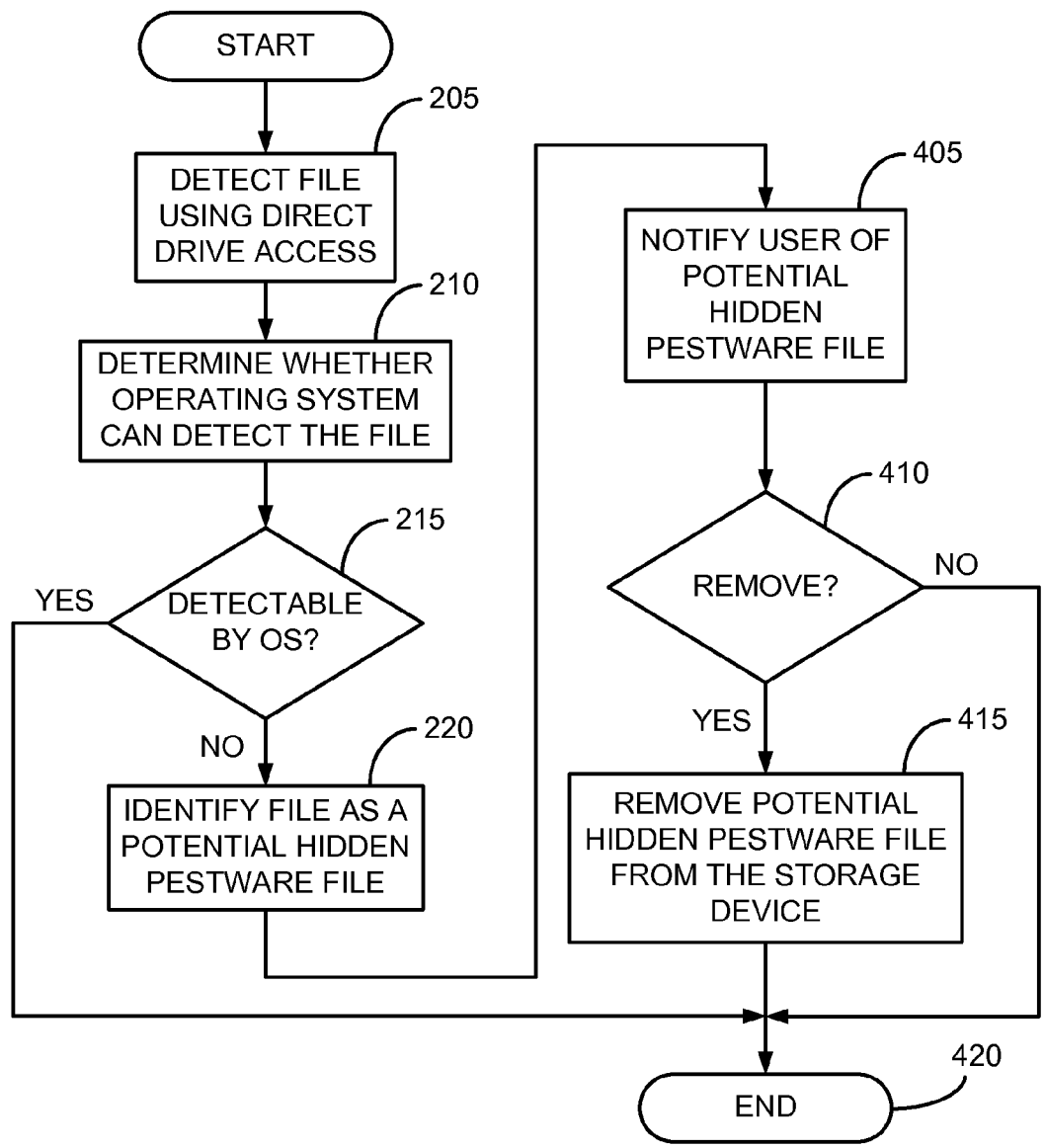
FIG. 4 is a flowchart of a method for detecting a potential hidden pestware file on a storage device of a computer in accordance with another illustrative embodiment of the invention.

FIG. 4 is a flowchart of a method for detecting a potential hidden pestware file 135 on a storage device 125 of a computer 100 in accordance with another illustrative embodiment of the invention. In FIG. 4, Blocks 205, 210, 215, and 220 are first performed as described in connection with FIG. 2. At 405, notification module 158 notifies a user of computer 100 that a potential hidden pestware file 135 has been detected. At 410, notification module 158 offers the user the option to delete the potential hidden pestware file 135. If the user chooses to remove the potential hidden pestware file 135 at 410, pestware-removal module 165 removes the potential hidden pestware file 135 from storage device 125 using direct drive access. At 420, the process terminates.

In conclusion, the present invention provides, among other things, a method and system for detecting potential hidden pestware files. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention as expressed in the claims. For example, though specific mention has been made of WINDOWS operating systems, the principles of the invention can be applied to other operating systems such as the operating system sold and distributed under the trade name LINUX.

What is claimed is:

1. A method for detecting a potential hidden pestware file on a storage device of a computer, the method comprising:

detecting, using direct drive access, a file on the storage device, the direct drive access bypassing a standard file Application-Program-Interface (API) function call of an operating system of the computer;

determining whether the file is detectable by the operating system by attempting to access the file using the standard file API function call of the operating system, the file being detectable by the operating system when the attempt to access the file using the standard file API function call is successful, the file being undetectable by the operating system when the attempt to access the file using the standard file API function call is unsuccessful;

identifying the file as a potential hidden pestware file, when the file is undetectable by the operating system; and performing the following when the file has been identified as the potential hidden pestware file:

notifying a user that the file is the potential hidden pestware file;

presenting to the user an option to remove automatically the potential hidden pestware file from the storage device; and removing, using direct drive access, the potential hidden pestware file from the storage device automatically in response to an input from the user.

2. The method of claim 1, wherein the method is performed in conjunction with scanning a data-bearing portion of the storage device, the scanning being performed sequentially in sector order using direct drive access.

3. A system for detecting a potential hidden pestware file on a storage device of a computer, the system comprising:

a file-detection module configured to detect, using direct drive access, a file on the storage device, the direct drive access bypassing a standard file Application-Program-Interface (API) function call of an operating system of the computer;

a file-analysis module configured to determine whether the file is detectable by the operating system by attempting to access the file using the standard file API function call of the operating system, the file being detectable by the operating system when the attempt to access the file using the standard file API function call is successful, the file being undetectable by the operating system when the attempt to access the file using the standard file API function call is unsuccessful;

a file-classification module configured to flag the file as the potential hidden pestware file, when the file is undetectable by the operating system;

a notification module configured, when the file has been flagged as the potential hidden pestware file, to:

notify a user that the file has been flagged as the potential hidden pestware file; and present to the user an option to remove automatically the potential hidden pestware file from the storage device; and a pestware-removal module configured to remove automatically, using direct drive access, the potential hidden pestware file from the storage device in response to an input from the user.

4. The system of claim 3, wherein the file-detection module is configured to scan a data-bearing portion of the storage device sequentially in sector order using direct drive access.

5. A non-transitory computer-readable storage medium containing program instructions executable by a processor to detect a potential hidden pestware file on a storage device of a computer, the program instructions comprising:

a first instruction segment configured to detect, using direct drive access, a file on the storage device, the direct drive access bypassing a standard file Application-Program-Interface (API) function call of an operating system of the computer;

a second instruction segment configured to determine whether the file is detectable by the operating system by attempting to access the file using the standard file API function call of the operating system, the file being detectable by the operating system when the attempt to access the file using the standard file API function call is successful, the file being undetectable by the operating system when the attempt to access the file using the standard file API function call is unsuccessful;

a third instruction segment configured to flag the file as the potential hidden pestware file, when the file is undetectable by the operating system;

a fourth instruction segment configured, when the file has been flagged as the potential hidden pestware file, to:

notify a user that the file has been flagged as the potential hidden pestware file; and present to the user an option to remove automatically the potential hidden pestware file from the storage device; and a fifth instruction segment configured to remove automatically, using direct drive access, the hidden pestware file from the storage device in response to an input from the user.

* * * * *